United States Patent
Cheng

(10) Patent No.: US 7,484,975 B2
(45) Date of Patent: Feb. 3, 2009

(54) ELECTRICAL CONNECTOR WITH AN INJECTING MECHANISM HAVING A DETACHABLE HANDLE

(75) Inventor: Yung-Chang Cheng, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/906,671

(22) Filed: Oct. 2, 2007

(65) Prior Publication Data

US 2008/0096410 A1 Apr. 24, 2008

(30) Foreign Application Priority Data

Oct. 2, 2006 (TW) ............................. 95217571 U

(51) Int. Cl.
*H01R 13/62* (2006.01)

(52) U.S. Cl. ..................................................... 439/159

(58) Field of Classification Search ......... 439/152–160, 439/327, 607, 326
See application file for complete search history.

(56) References Cited

U.S. PATENT DOCUMENTS

| 5,997,325 | A | * | 12/1999 | Hara ........................... 439/159 |
| 6,030,238 | A | * | 2/2000 | Dong .......................... 439/159 |
| 6,033,243 | A | * | 3/2000 | Kajiura ....................... 439/159 |
| 6,042,402 | A | * | 3/2000 | Tung et al. .................. 439/159 |
| 6,074,227 | A | * | 6/2000 | Ho et al. ..................... 439/159 |
| 6,102,720 | A | * | 8/2000 | Tung .......................... 439/159 |
| 6,857,886 | B2 | * | 2/2005 | Lai et al. .................... 439/159 |
| 7,189,088 | B2 | | 3/2007 | Cheng et al. |
| 2006/0246757 | A1 | | 11/2006 | Ting et al. |
| 2006/0246782 | A1 | | 11/2006 | Ting et al. |

* cited by examiner

*Primary Examiner*—Chandrika Prasad
(74) *Attorney, Agent, or Firm*—Wei Te Chung

(57) ABSTRACT

An electrical card connector (100) comprises an insulating housing (1) receiving a plurality terminals (2), a shield plate (4) mounted on the insulating housing, and an ejecting mechanism (3) assembled on a lateral side of the shield plate. The ejecting mechanism comprises a pushing pole (30) and a handle (32) assembled on the pushing pole. The handle is capable of separating from the pushing pole.

16 Claims, 5 Drawing Sheets

ELECTRICAL CONNECTOR WITH AN INJECTING MECHANISM HAVING A DETACHABLE HANDLE

BACKGROUND OF THE INVENTION

1. Field of the Invention

The present invention generally relates to an electrical card connector, and more particularly to an electrical card connector having an ejecting mechanism.

2. Description of Prior Art

Modern times, the PC card is always used as an external equipment for increase the storage of the electrical consumer products, like Mobile phone, Digital camera, etc. The electrical card connector is used for electrically connecting the PC card and the electrical consumer products. An ejecting mechanism is used on the card connector for ejecting the card from the card connector. U.S. Pat. No. 2006/0246757 discloses a card connector with an ejecting mechanism. The ejecting mechanism comprises a pole, a slider, and a frame. The pole comprises a handle beyond the card connector. The handle is integrated with the pole. However, if the handle is broken, we should change the whole pole, even the whole card connector.

Hence, it is desirable to have an improved card connector to overcome the above-mentioned disadvantages of the prior art.

BRIEF SUMMARY OF THE INVENTION

Accordingly, the object of the present invention is to provide an electrical card connector having an ejecting mechanism capable of changing the handle easily.

In order to achieve the above-mentioned object, an electrical card connector comprises an insulating housing receiving a plurality terminals, a shield plate mounted on the insulating housing, and an ejecting mechanism assembled on a lateral side of the shield plate. The ejecting mechanism comprises a pushing pole and a handle assembled on the pushing pole. The handle is capable of separating from the pushing pole.

Other objects, advantages and novel features of the invention will become more apparent from the following detailed description of the present embodiment when taken in conjunction with the accompanying drawings.

DETAILED DESCRIPTION OF THE INVENTION

Figure 1:
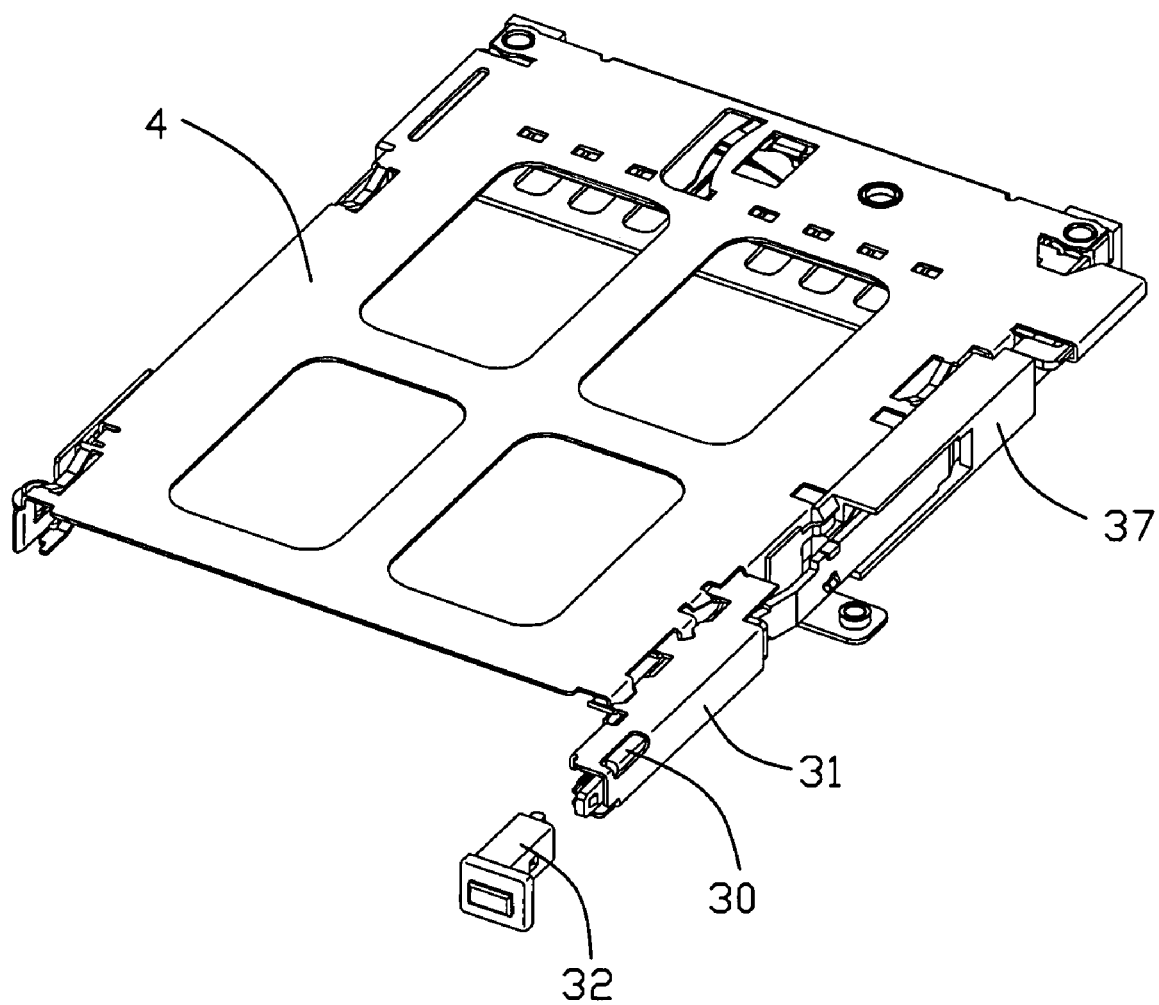
FIG. 1 is a perspective view of an electrical card connector in accordance with the present invention.

Reference will now be made to the drawing figures to describe the present invention in detail.

Figure 2:
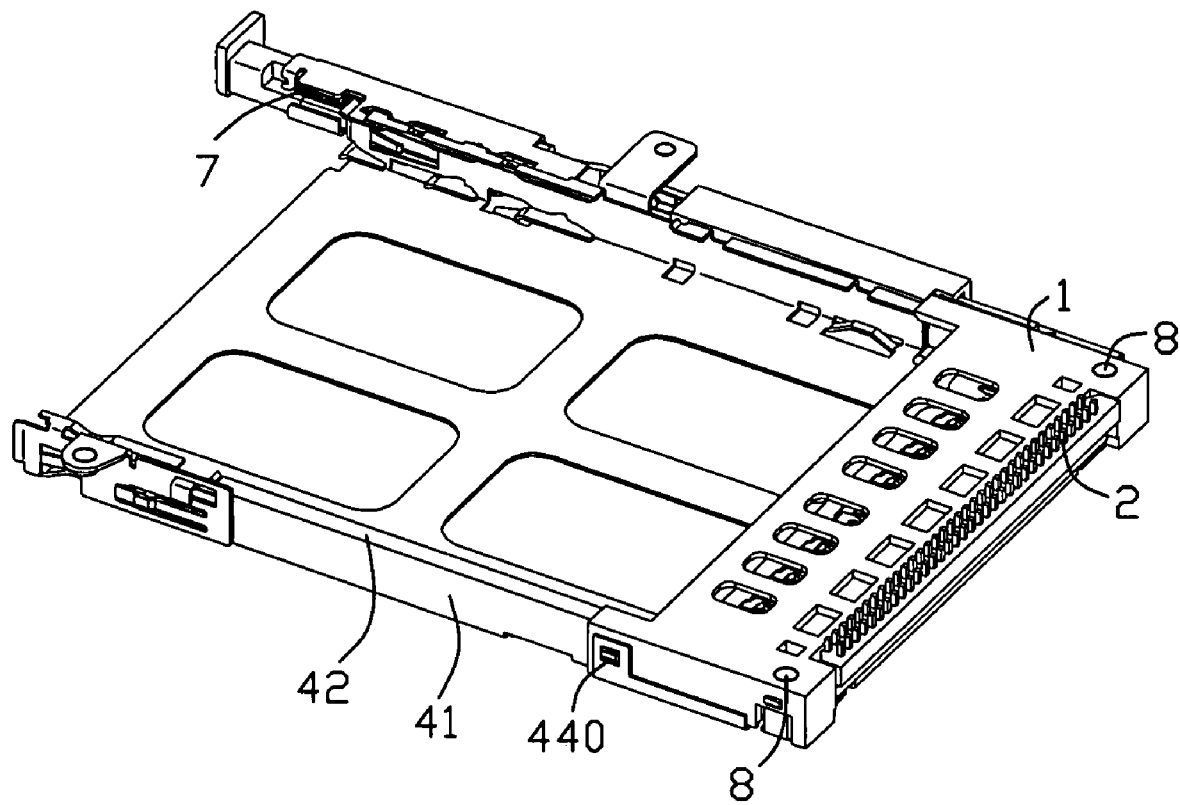
FIG. 2 is a view similar to FIG. 1, but taken from a different aspect.

Referring to FIG. 1 and FIG. 2, an electrical card connector 100, mounted on a printed circuit board (not shown), shown therein of a receiving slot for receiving a card and is generally used in a notebook computer. The electrical card connector comprises an insulating housing 1, a plurality of terminals received in the insulating housing 1, a shield plate 4 assembled on the insulating housing 1 and an ejecting mechanism 3 assembled on a lateral side of the shield plate 4.

Figure 3:
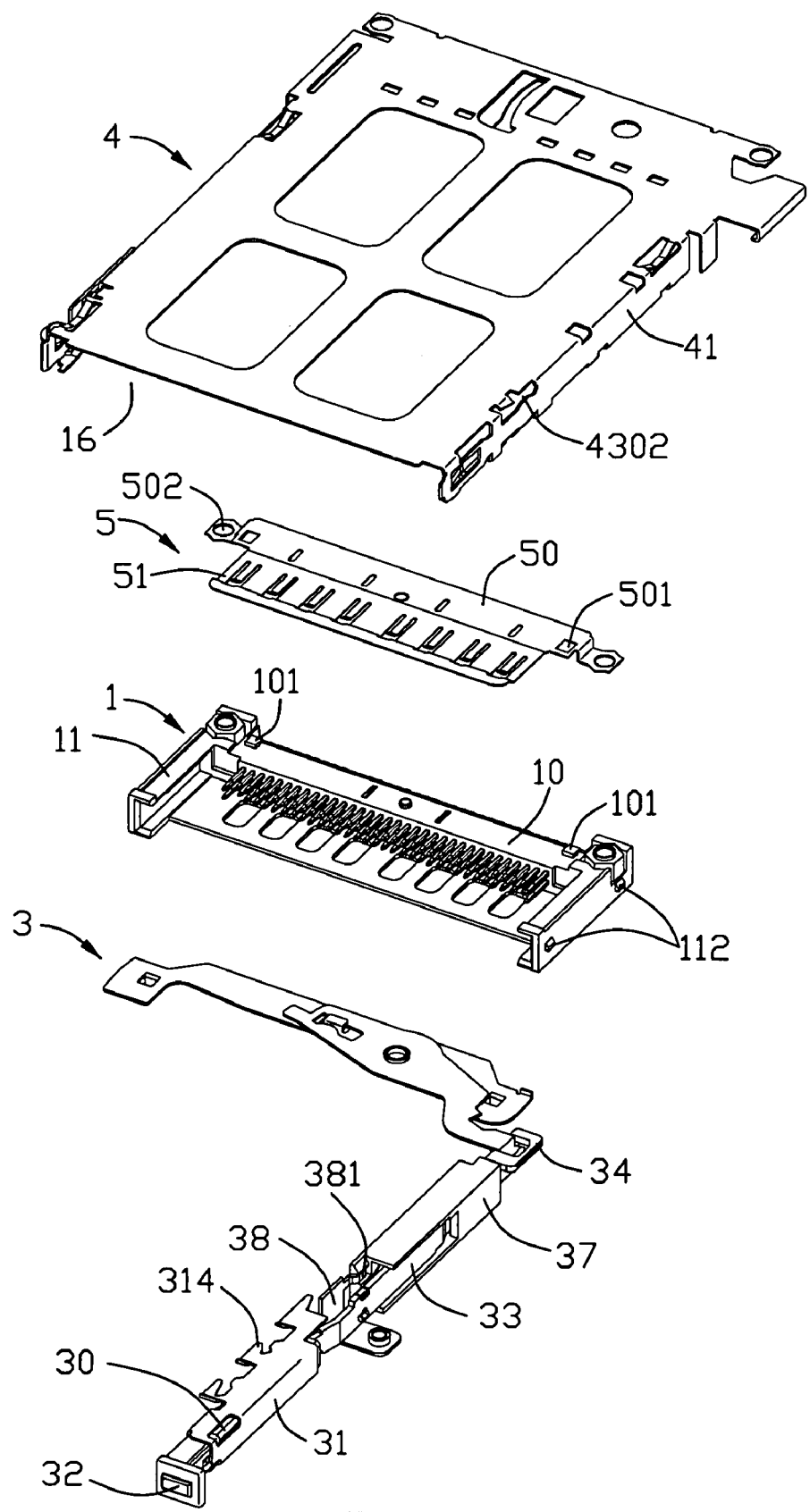
FIG. 3 is an exploded, perspective view of the card connector shown in FIG. 1.

Turning to FIG. 3, the elongated insulating housing 1 comprises a base portion 10 defining a plurality channels 102 for receiving the terminals 2, and a pair of guiding arms 11 extending from the opposite ends of the base portion 10. The base portion 10 forms a block 101 and a pair of thread holes 8 on the opposite ends thereof. The guiding arms 11 is used for guiding a card inserting, and each forms a plurality of retaining blocks 112 on a outer surface thereof and separately arranged in a card inserting direction. The terminals 2 partially received in corresponding channels 102.

The shield plate 4 comprises a top plate 40 and a pair of lateral plates 41 extending downwardly from opposite edges of the top plate 40. Said ejecting mechanism 3 is assembled on one of the lateral plates 41. The lateral plates 41 defines a inserting opening 16 in the card inserting direction opposite to the insulating housing 1 and a plurality of holding holes 440 corresponding to the retaining blocks 112 of the housing 1. The lateral plate 41 the ejecting mechanism 3 mounted on further comprises a cutout adjacent to the opening 16 and a plurality of retaining cutout 4302.

The electrical connector 100 further comprises a grounding plate 5. The grounding plate 5 comprises a main body 50, a grounding bar 51 extending from the main body 50, a pair of holes 502 on the opposite ends of the main body 50 and a pair of retaining holes 501 on the main body 50. The holes 502 engages with corresponding blocks 101 of the housing 1. The retaining holes 501 are overlapped on corresponding thread holes 8 of the housing 1. A pair of screws pass through the thread holes 8 and the retaining holes 501 for retaining the grounding plate 5 on the housing 1.

Figure 4:
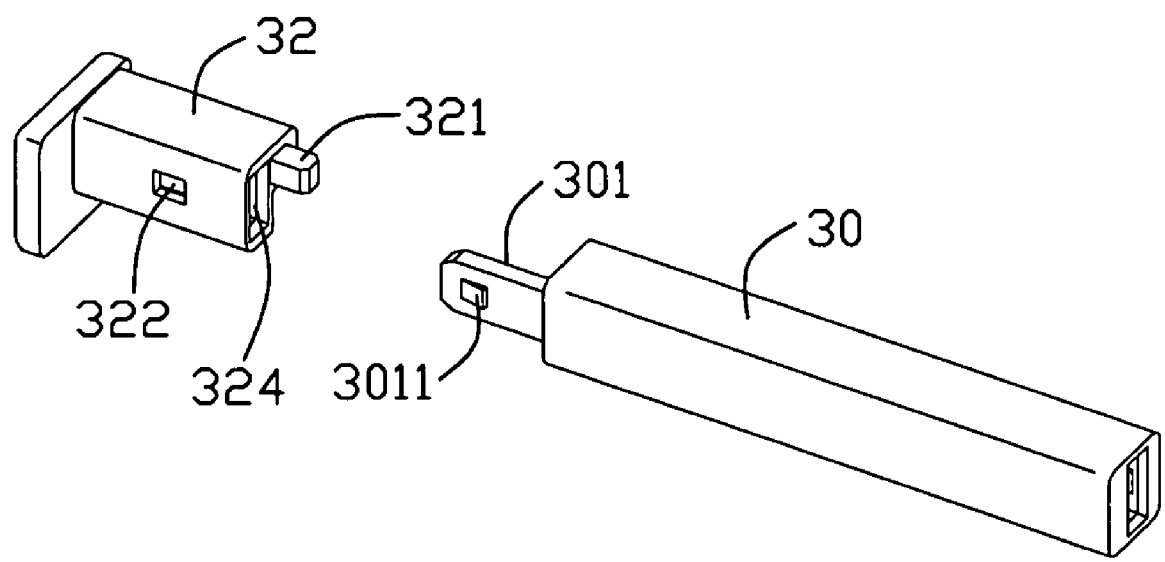
FIG. 4 is a view of a pushing pole and a handle of the electrical card connector shown in FIG. 1.
Figure 5:
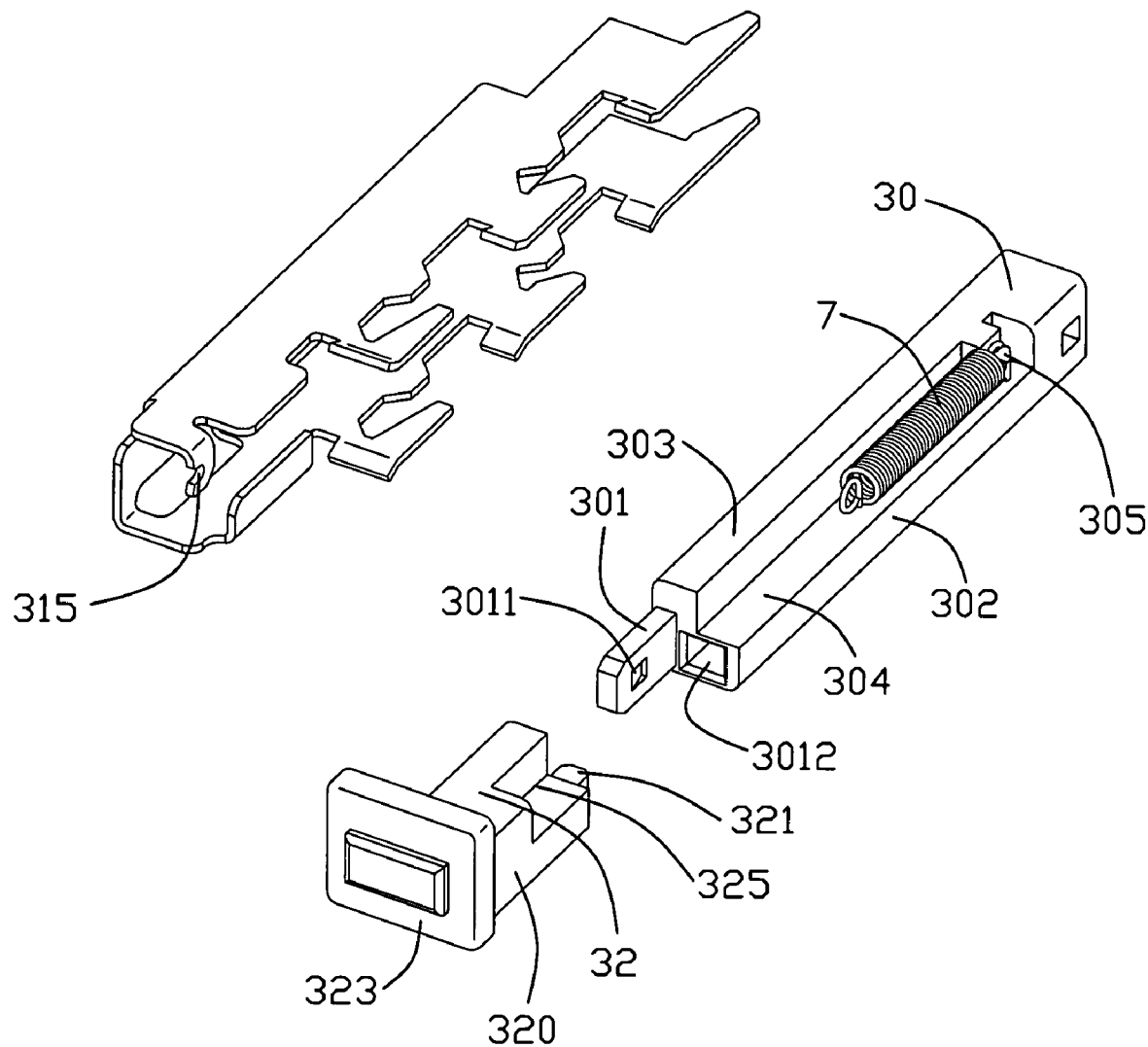
FIG. 5 is a view of the pushing pole, the handle and a frame shown in FIG. 1.

Both the structure of the ejecting mechanism 3 and the way to assemble the ejecting mechanism 3 on the shield plate 4 have been disclosed in prior art. The ejecting mechanism 3 comprises a set of pushing mechanism and a set of resisting mechanism. The pushing mechanism comprises a limiting member 37, a straight pole 34 movably received in the limiting member 37, a metal frame 31, a pushing pole 30 received in the frame 31 and a handle 32 mounted on the pushing pole 30. Referring FIG. 4 and FIG. 5, the pushing pole 30 comprises a base portion 302, a wall 303 extending upwardly from the base portion 302, and a slot 304 defined by the base portion 302 and the wall 303. The base portion 302 comprises a metal retaining portion 301 projecting from one end face thereof, and a retaining channel 3012 with an opening defined on one end face thereof adjacent to the retaining portion 301. The retaining portion 301 forms a retaining section 3011 thereon. The handle 32 comprises a base 320, a pressing portion 323 forming on a end of the base 320, and a slot defining on the base 320. The base 320 comprises a tuber extending therefrom, and a receiving passageway 324 with an opening on a end thereof opposite to the pressing portion 323. The receiving passageways 324 defines a cutout 322 on a lateral side of the base 320. During the handle 32 assembled to the pushing pole 30, the metal retaining portion 301 of the pushing pole 30 is inserted into the passageway 324 of the handle 32 with the retaining section 3011 locking with the cutout 322. Correspondingly, the tuber 321 of the handle 32 is received in the receiving channel 3012 of the pushing pole 30. Thereby, the handle 32 is retaining on the pushing pole 30. The slot 304 of the pushing pole 30 and the slot 325 of the handle together form a receiving slot (not labeled). Because the metal retaining portion 301 is resilient, the handle 32 is separated from the pushing bar 32 by pressing the retaining section 3011 out of the cutout 322. The pushing pole 32 further forms a holding bar 305 extending laterally from the wall 303 into the receiving slot. The frame 31 comprises a plurality of locking bars 314 locking with corresponding retaining holes 4302 of the shield plate 4 for mounting the pushing mechanism on the shield plate 4, and a sting 315 extending into the receiving slot opposite to the holding bar 314. A spring 7 is retaining in the receiving slot with one end locking with the holding bar 305 and the other end locking with the sting 315 of the frame 31.

When the handle 32 of the ejecting mechanism is broken, we just need replace the broken handle 32 with a new one.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector comprising:
   an insulating housing receiving a plurality terminals;
   a shield plate mounted on the insulating housing; and
   an ejecting mechanism assembled on a lateral side of the shield plate, comprising a pushing pole and a handle assembled on the pushing pole;
   wherein the handle is capable of separating from the pushing pole; said pushing pole comprises a metal retaining portion wrapped by plastic, and the metal retaining portion projects from one end of the pushing pole and is received by the handle.

2. The electrical card connector as claimed in claim 1, wherein the handle forms a tuber, and the pushing pole defines a receiving channel, the tuber is received in the receiving channel.

3. The electrical card connector as claimed in claim 1, wherein the handle defines a receiving passageway, the retaining portion is received in the receiving passageway.

4. The electrical card connector as claimed in claim 3, wherein the retaining portion comprises a retaining section, the receiving passageway defines a cutout, the retaining section locks with the cutout.

5. The electrical card connector as claimed in claim 1, wherein the ejecting mechanism comprises a spring, and wherein the pushing pole and the handle together defines a receiving slot with the spring located therein.

6. The electrical card connector as claimed in claim 5, wherein the ejecting mechanism further comprises a frame, the pushing pole is movably received in the frame.

7. The electrical card connector as claimed in claim 6, wherein the pushing pole forms a holding bar extending into the receiving slot, the frame forms a sting extending into the receiving slot opposite to the holding bar, the spring is retained in the received slot by one end locking with the holding bar and the other end locking the sting.

8. An electrical card connector comprising:
   an insulating housing receiving a plurality terminals;
   a shield plate mounted on the insulating housing;
   an ejecting mechanism assembled on a lateral side of the shield plate, comprising a pushing pole and a handle detachably assembly to the pushing pole; wherein
   said pole includes an L-shaped cross-sectional configuration with a coil spring embedded in a recess defined by said L-shaped cross-sectional configuration;
   said spring is stretchable to move between an original position and an extended position in the recess of the pushing pole.

9. The electrical card connector as claimed in claim 8, wherein two locking positions are formed on at a front end of said L-shaped cross-sectional configuration.

10. The electrical card connector as claimed in claim 8, wherein the handle forms a protrusion and a receiving cavity assembled to corresponding recess and protrusion of said pole.

11. The electrical card connector as claimed in claim 8, wherein said handle includes a pressing portion at a distal end which is expanded laterally.

12. The electrical card connector as claimed in claim 8, wherein said spring has one end hooked to a metallic frame of the ejecting mechanism to perform in an extension manner.

13. An electrical card connector comprising:
    an insulating housing receiving a plurality terminals;
    a shield plate mounted on the insulating housing; and
    an ejecting mechanism assembled on a lateral side of the shield plate, comprising a plastic pushing pole enclosed in and slidable along a metallic frame in a front-to-back direction between front and rear positions, and a handle detachably assembled to the pushing pole; wherein
    unless disassembled from the pole, the handle is securely fixed, without relative movement, to the pole for use once assembled thereto; wherein
    said pole includes an L-shaped cross-sectional configuration with a coil spring embedded in a recess defined b said L-shaped cross-sectional configuration, and a rear end portion of the handle defines another L-shaped cross-sectional configuration in compliance with said L-shaped cross-sectional configuration to receive the coil spring when the push rod is moved to said rear position.

14. The electrical card connector as claimed in claimed 13, wherein the handle extends forwardly out of the frame with an expanded pressing portion at a distal end.

15. The electrical card connector as claimed in claimed 14, wherein the pole dose not extend forward beyond the frame.

16. The electrical card connector as claimed in claim 13, wherein said plastic pushing pole comprises a metal retaining portion wrapped by the plastic, and the metal retaining portion projects from an end of the pushing pole and mates with the handle.

* * * * *